(12) United States Patent
Hastilow

(10) Patent No.: US 6,571,484 B2
(45) Date of Patent: Jun. 3, 2003

(54) CONFORMANCE GAUGE

(75) Inventor: Neil K Hastilow, Bristol (GB)

(73) Assignee: Rolls-Royce PLC, London (GB)

( * ) Notice: Subject to any disclaimer, the term of this patent is extended or adjusted under 35 U.S.C. 154(b) by 111 days.

(21) Appl. No.: 09/771,647

(22) Filed: Jan. 30, 2001

(65) Prior Publication Data

US 2001/0023543 A1 Sep. 27, 2001

(30) Foreign Application Priority Data

Feb. 2, 2000 (GB) .............................................. 0002421

(51) Int. Cl.$^7$ .............................. G01B 5/20; G01B 3/14; G06G 1/00
(52) U.S. Cl. .............................. 33/546; 345/964; 703/6; 703/7
(58) Field of Search ........................ 33/546, 545, 1 BB, 33/501.05, 549, 551; 703/1, 6–7; 700/28–32, 182; 345/964

(56) References Cited

U.S. PATENT DOCUMENTS 6,025,847 A * 2/2000 Marks ........................ 345/419
6,198,487 B1 * 3/2001 Fortenbery et al. ......... 345/420
6,205,240 B1 * 3/2001 Pietrzak et al. ............. 382/152
6,393,331 B1 * 5/2002 Chetta et al. ................. 700/97
2002/0029138 A1 * 3/2002 Rohl ............................ 703/22
2002/0077796 A1 * 6/2002 Manuel et al. ................. 703/7

FOREIGN PATENT DOCUMENTS

JP          02041573 A   *   9/1990   ............ G06F/15/60

* cited by examiner

Primary Examiner—Christopher W. Fulton
Assistant Examiner—Gail Verbitsky
(74) Attorney, Agent, or Firm—Oliff & Berridge, PLC

(57) ABSTRACT

A conformance gauge is used as an inspection tool to check that component features lie within tolerance limits. When the component has been designed using CAD tools the CAD data file defining external surfaces of the component is used as the basis to create a second CAD data file defining the surfaces of the inspection to conform to the corresponding surfaces of the component. Viewing apertures or slots are then defined in the data file to the tolerance limits of features to be checked. The second CAD data file is then provided to a rapid prototyping system, eg a stereolithography machine to produce the final inspection gauge.

8 Claims, 2 Drawing Sheets

CONFORMANCE GAUGE

Figure 1:
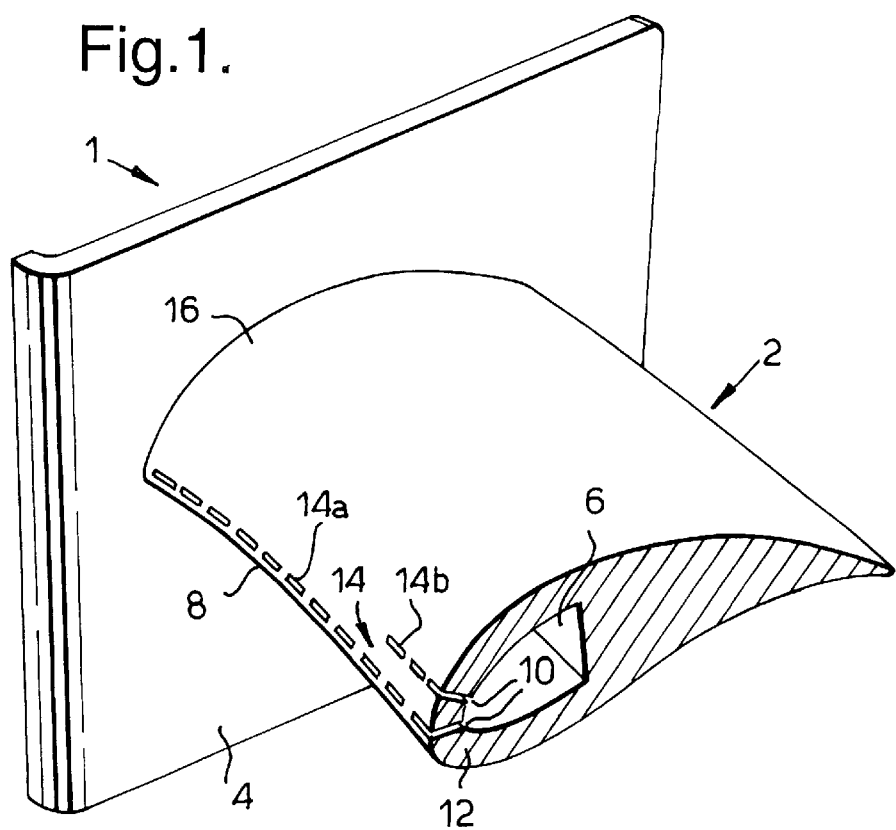

The present invention relates to the design and manufacture of a gauge for checking conformance of surface features of a manufactured component.

A conformance gauge is used as an inspection tool to check that a manufactured component conforms to its nominal design within permitted limits. In particular the invention concerns the manner in which the gauge itself is manufactured in order to minimise manufacturing variations which could compromise the inspection procedure. In a particular embodiment described to illustrate the invention, a conformance gauge is used to check the positions of cooling holes formed in the leading edge of a cast nozzle guide vane for a gas turbine engine.

In a gas turbine engine, an annular array of nozzle guide vanes is located in the exit annulus of the combustion chamber to impart 'swirl' to the hot gas stream entering the first turbine stage. To protect these vanes from the hot gas each has a number of cooling holes formed along or close to its leading edge through which relatively cool air from the engine compressor is supplied to form a protective film over the exterior surfaces (gas-washed surfaces) of the vane. The cool air is fed through a passage in the interior of the vane and vented through holes formed through the walls of the vane. The cool air then forms a protective film of air across the gas-washed surfaces that prevent impingement of the hot gases and consequent damage to the vane.

It is important to minimise the amount of cooling air required as it has a direct impact on the efficiency of the gas turbine engine. To this end, cooling holes are positioned only in critical areas such as the leading edge of the vane. Furthermore, the cooling hole exit apertures may be shaped to maximise the efficiency of the protective film. As a result, the shape and position of each cooling hole, particularly the location and shape of the exit, is critical and it is essential therefore that the cooling hole exit apertures are within prescribed tolerance limits calculated at the design stage.

Determining that these cooling holes are positioned within the prescribed tolerance limits is difficult. At the design stage, each hole is dimensioned from a datum located at the centre of the vane. Once the vane has been manufactured however, this datum is inaccessible and so the holes must be checked relative to at least one other external feature. Typically the gas washed surfaces of the vane are used, because they share the same datum as the cooling holes and, being a high tolerance feature, minimise additional error. Nevertheless all surfaces and edges are toleranced and none, neither surface nor hole, can be relied upon to be exactly at its nominal design position, hence the need to check during inspection.

The current method for checking the hole locations relative to the gas washed surfaces is to use a "sighting gauge" made of clear material, such as a polycarbonate sheet vacuum formed over a buck; which may be either an example of a cast vane or a purpose built die. Lines are drawn or scribed onto the vacuum formed sheet to indicate the tolerance limits of the cooling hole positions. During inspection, a manufactured vane is inserted into the gauge and the positions of the cooling hole exit apertures in the vane are checked against the scribed limit lines on the gauge. If the cooling holes do not lie within the scribed tolerance limits, the component is rejected.

A good fit between a gauge and manufactured component is important to successful inspection. While the vacuum forming process ensures that the internal contact surface of the gauge is the converse of the surface of the back on which the gauge was formed, manufacturing variations in the buck mean that the contact surface of the gauge almost certainly is not an accurate nominal surface and is inevitably biased toward one or the other of the tolerance limits. As a result, the surfaces of the gauge and vane do not interlock accurately in every pairing and the small variations in the gas-washed surface of the vane and the positions of the formed cooling holes can result in acceptable blades being rejected, or vice versa.

The current gauge is made in three steps, each of which inevitably introduces errors. When the buck is manufactured, errors are introduced, (particularly where the buck is an actual vane, subject to the manufacturing tolerances of a production component). Further errors are introduced when the polycarbonate is vacuum formed about the buck due to shrinkage and distortion. Still further errors are introduced when marking the polycarbonate due to the difficulty of assessing nominal positions of the holes from the design, represented by drawings which can show only a two-dimensional view of the vane.

While each error may be small in isolation, the effect is cumulative. Deviation in the form of the gauge serves to reduce the accuracy of interlock between vane and gauge reducing the accuracy of the gauge. This inaccuracy is compounded by the errors in marking. Further inaccuracies are then introduced when the features are inspected as a result of parallax error. In use, it is important that the inspector views a given feature at the correct angle through the gauge. This gives scope for error or misinterpretation, a problem compounded by optical distortion arising from viewing through the polycarbonate.

Also the use of a cast buck to manufacture the gauge, whether an actual vane or special blank, involves an inevitable time delay at a time when manufacturing processes are making increasing use of simultaneous engineering techniques. The time delay involved when design changes are introduced may be no longer acceptable.

It is an objective of the present invention to provide gauges with improved accuracy, reduced cost and lead times.

According to the present invention a method of design and manufacture of a conformance gauge for checking conformance of at least one selected feature of a manufactured component within tolerance limits of the nominal dimensions of the feature, the component having been designed using CAD tools, through use of which there has been created a first CAD data file containing the co-ordinates of the nominal dimensions of the component design and the said at least one selected feature, the method of designing the conformance gauge comprising creating a second CAD data file containing the co-ordinates of the nominal dimensions of the conformance gauge including an inspection feature corresponding to the at least one selected feature of the component design, wherein the co-ordinates of the inspection feature are derived from or are copied from the co-ordinates of the at least one selected feature contained in the first CAD data file.

The term "conformal gauge" is used in this specification to mean a gauge which relies at least in part upon one or more surfaces engaging with corresponding component surfaces to be inspected and upon this fitting of one with the other to ensure that the gauge is correctly aligned with the component to be inspected.

In a modem component design process using computer aided design equipment (CAD) a CAD file for the gauge is created directly from a CAD model of the manufactured component, preferably using the data contained in the original file. This allows the gauge to share the same three-dimensional geometry as the inspected component and ensure a conformal fit between gauge and inspected component. A rapid prototyping apparatus is then used to create a gauge directly from the CAD file.

In effect, the gauge is produced from a nominal example of the component to be inspected, thereby eliminating inaccuracies introduced by the additional step in which a manufactured component is used as a mould onto which the gauge is vacuum formed. As previously mentioned, these inaccuracies arise from both manufacturing tolerances and from the vacuum forming process itself. Another advantage is that the gauge design and manufacture process does not need to be delayed until an example of the inspected component is manufactured, thus facilitating simultaneous engineering of component and gauge. Where the construction of new gauges is necessary, such as damage or expiry of gauges in use, lead time is reduced to less than a day. This reduces considerably the requirement for spare gauges kept in stock. Cost is also substantially less than the original method.

In a preferred embodiment of the invention, a number of inspection apertures or slots are created in the CAD file of the gauge. Each such aperture or slot is shaped to bound a region in which a feature which conforms to the prescribed tolerance must lie. The gauge is then created using the rapid prototyping process and apparatus.

Because the inspection apertures so created are integral with the manufacture of the gauge, the need to mark the gauge after manufacture and the attendant inaccuracy is avoided. Also tougher materials (such as nylon or metal in the case of laser sintering) may be used as the gauge no longer needs to be transparent or vacuum formed.

As well as improvements in gauge quality, the ease of use is improved because the region within which a feature must lie is bound by gauge material flush with the surface of the component. This eliminates parallax error during inspection and, because the inspection means is now viewing via an aperture in the gauge, no optical distortion comes into play.

Figure 3:
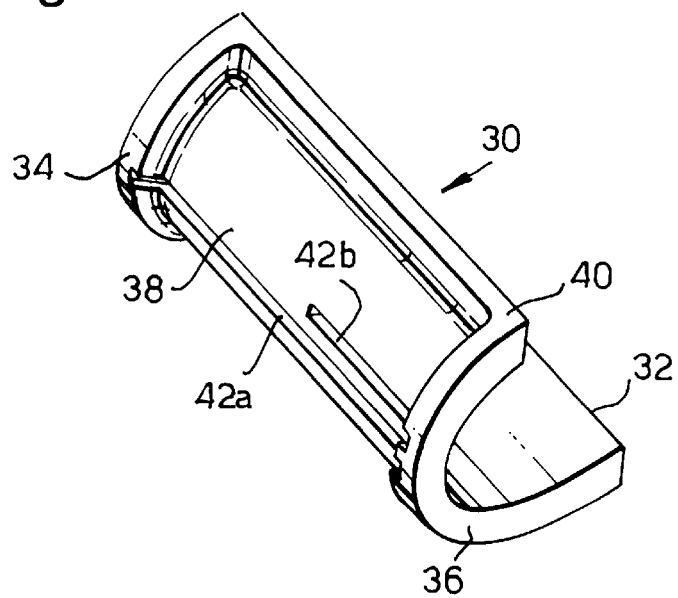
Figure 4:
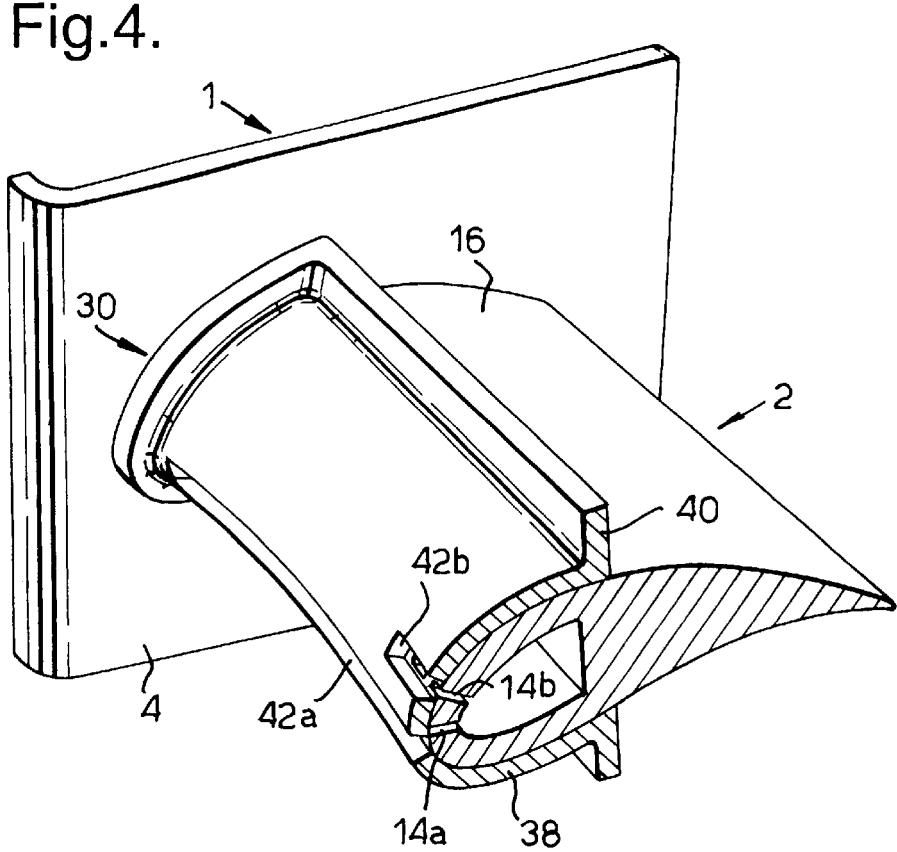

The invention and how it may be carried into practice will now be more particularly described with reference, by way of example, to the accompanying drawings, in which:

FIG. 1 shows a single nozzle guide vane for use in an annular guide vane assembly the exit of a gas turbine engine combustion chamber. The vane has been sectioned so that internal features including the cooling passage within the vane are visible, FIG. 2 shows a vacuum-formed polycarbonate inspection gauge as currently being used to inspect the vane shown in FIG. 1, FIG. 3 shows an example of an inspection, gauge designed using CAD data and manufactured by stereolithographic apparatus, and FIG. 4 shows the inspection gauge of FIG. 3 located on the guide vane of FIG. 1 for inspection of the latter component.

Referring now to the drawings, FIG. 1 shows a vane 1 which has been cast and drilled and is ready to be inspected. The vane is sectioned to reveal internal features. The vane 1 comprises an aerofoil section 2 upstanding from a vane platform 4. A complete vane normally has two platforms one at either end of the aerofoil section 2 but in this view the platform nearest the viewer has been omitted for clarity. Revealed in the sectioned view are: an internal cooling passage 6 which extends along the length of the aerofoil section 2 and is spaced a short distance behind the leading edge 8 of the vane; and a multiplicity of cooling holes 10 drilled through the wall 12 of the vane which communicate with cooling air exit apertures 14 in the external gas washed surface 16 of the vane aerofoil section. The vane may also be formed with additional internal cooling features not shown in the drawing.

During engine operation, relatively cool air flows through the internal cooling passage 6 which acts as a plenum supplying the holes 10 and exit apertures 14 to form a cooling film over gas washed surface 16 of the component. The position of the exits 5 on the vane 1 are critical to the effectiveness of the cooling film and so must lie within a prescribed tolerance of the nominal position, decided as part of the design process.

Figure 2:
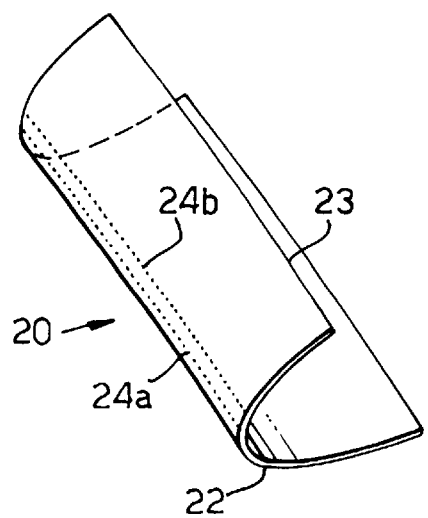

FIG. 2 shows an existing gauge 20 as currently used to inspect the vane shown in FIG. 1, in particular to check the conformance of the positions of the cooling air exit apertures 14 to the prescribed design tolerance limits. In this particular vane embodiment these apertures are arranged in two arrays indicated at 14a,14b. As previously mentioned the gauge 20 comprises a sheet 22 of polycarbonate material which has been heated to soften it and then vacuum formed over a buck representing a nominal nozzle guide vane. That is the buck is assumed to possess, or has been selected on the basis that is possess dimensions which are precisely, or at least substantially, the same as the nominal value of the design dimensions. The design tolerance limits for the positions of the air exit apertures 14, that is where the cooling holes 10 break through the exterior surface 16 of the wall 12 of the vane, are scribed onto the outer surface 23 of the gauge 20 as lines 24a,24b. For the sake of clarity only one pair of lines is illustrated and the distance separating them has been exaggerated slightly.

An inspection procedure for the vane 1 includes the step of checking conformance of the position of cooling air exit apertures 14 within their location limits. To facilitate this inspection step the gauge 20 of FIG. 2 is placed over the aerofoil section 2 of the vane of FIG. 1. In the absence of any manufacturing errors the inner surface 26 of the gauge 20 would be in contact at all points with exterior surface 16 of the aerofoil section 2. However, in reality the positions of all surfaces, edges and features deviate from their nominal design locations for both the vane 1 and the gauge 20. As a result the surfaces 26,16 may be in contact in some areas and be separated at others, the cooling holes 10 may be misaligned, and the apertures 14 where the holes 10 break through the surface 16 are displaced accordingly. In addition to these physical errors parallax errors occur in observations by the inspector because of the thickness sheet 22 and any separation distance between the vane and gauge surfaces.

The inspection gauge 30 illustrated in FIG. 3 is manufactured by a process which seeks to avoid at least some of these problems. According to the present invention, where the original nozzle guide vane 1 of FIG. 1 has been designed using computer aided design tools then a CAD data file exists which describes all the surfaces and features of the vane including the position of the cooling air exit apertures 14 relative in the vane surface 16 relative to the leading edge 8. The same data is now utilised to describe the inner surface 32 of gauge 30. Corresponding data describing the gas washed surface of the vane and platform 4 and its counterpart (not shown) at the opposite end of the aerofoil section 2 is used to define the end faces 34,36 of the gauge. Having defined the critical faces 32,34,36 further data may be added to the data file defining the thickness of the main body 38 of the gauge and a peripherally extending marginal rib 40 which increases the stiffness of the gauge body 38.

Furthermore the data defining the tolerance limits of the locations of the cooling hole exit apertures 14 in the vane surface 16 are used to generate the boundaries of slots 42a,42b in the body 38 of the gauge corresponding to the combined limits of the two aperture arrays 14a,14b respectively. The data file, including these changes thus constitutes a second CAD data file describing the gauge 30.

This second CAD data file is now used as the component design input to a rapid prototyping system and is used in the normal manner of such systems to create a useable inspection gauge. In the example being described the rapid prototyping system consists of a stereolithography apparatus in which a model is built-up in layers by a laser scanning across the surface of a tank of photo-curable resin over a platen submerged just below the resin surface. As each layer is completed the platen is lowered to form a fresh film of resin on top of the previously cured layer and the scanning process is repeated for the next layer. The process proceeds layer by layer until the whole component is built-up. The stereolithography process is described in available literature in more detail and therefore will not be described further here. Other suitable rapid prototyping processes and systems may be used if appropriate.

In the described example a photocurable resin system may be used which produces a fully transparent, or a translucent, or even an opaque product. Since the improved gauge uses a slot to view the location of features on an inspected component it is not necessary that the said features are viable through a transparent gauge material.

Referring now to FIG. 4 the gauge 30 of FIG. 3 is illustrated mounted on the nozzle guide vane 1 of FIG. 1 as it would be during an inspection procedure. Visible in FIG. 1 are a linear array 14a of exit apertures extending along the whole length of the leading edge, and a shorter array 14b of apertures which extends only part way along the leading edge and spaced apart a short distance to the side of the first array 14a. Correspondingly in gauge 30 there is formed a full length viewing slot 42a and to one side a second shorter viewing slot 42b. The length and width of these slots 42a,42b are chosen in accordance with the maximum limits of the positions to the apertures in the respective arrays 14a,14b.

In the drawing it will be seen that the cooling holes 10 which form the apertures 14b emerge on surface 16 in the centre of the slot 42b in the gauge. However, the further cooling holes which form the apertures 14a, at least those closest the viewer, emerge on surface 16 under the upper margin of slot 42a. Thus according to the inspection criteria the apertures 14a fall outside an acceptable tolerance limit and the vane in question would fail inspection. The question of possible parallax error does not arise in this instance, or at worst is minimised because the tolerance limit is defined by the edge between the wall of slot 42a and the inner surface 32 of gauge 30 which is adjacent the vane surface 16. In contrast in the prior art gauge 20 of FIG. 1 the tolerance limit indicated by line 24b is scribed on the surface 23 which is spaced above the surface 16 by at least the thickness of the gauge. In some cases where an air gap is present between the inner surface of the inspection gauge and the vane exterior surface parallax is introduced. In the prior art gauge where the manufacturing variation of the gauge is possibly additive to a manufacturing variation of the cumulative error may be such that when used on vane the variation of which is in the opposite direction inspection assessment the differential errors may make it almost impossible to complete the inspection with confidence. With the invention, however, the variation of the buck is eliminated and, providing the errors introduced by the rapid prototyping system are acceptable the inspection may be completed with a greater level of confidence.

What is claimed is:

1. A method of design and manufacture of a conformance gauge for checking conformance of at least one selected feature of a manufactured component within tolerance limits of the nominal dimensions of the feature, the component having been designed using CAD tools, through use of which there has been created a first CAD data file containing the co-ordinates of the nominal dimensions of the component design and the at least one selected feature, the method of designing the conformance gauge comprising creating a second CAD data file containing the coordinates of the nominal dimensions of the conformance gauge including an inspection feature corresponding to the at least one selected feature of the component design, wherein the co-ordinates of the inspection feature are derived from or are copied from the co-ordinates of the at least one selected feature contained in the first CAD data file, and then manufacturing the gauge via rapid prototyping process using the second CAD data file.

2. A method as claimed in claim 1 wherein the inspection feature formed in the gauge is a viewing aperture, the edges of which are determined by the tolerance limits of the at least one selected feature.

3. A method as claimed in claim 1 wherein for the purpose of locating the conformance gauge on the manufactured component during checking conformance of the at least one feature, the gauge is manufactured with a surface intended to conform to a selected surface on the manufactured component, and the co-ordinates of the surface on the gauge contained in the second CAD data file are copied from the co-ordinates of the selected surface contained in the first CAD data file.

4. A method as claimed in claim 3 wherein the inspection feature formed in the gauge is a viewing aperture formed through the surface intended to conform to the selected surface on the manufactured component, and the edges of the viewing aperture are determined by the tolerance limits of the at least one selected feature.

5. A method as claimed in claim 1 wherein the second CAD data file defining the conformance gauge is supplied to a computer controlled rapid prototyping system to produce the conformance gauge.

6. A conformance gauge for checking conformance of at least one selected feature of a manufactured component within tolerance limits of the nominal dimensions of the feature designed and manufactured in accordance with the method of claim 1.

7. A conformance gauge for checking conformance of at least one selected feature of a manufactured component within tolerance limits of the nominal dimensions of the feature designed and manufactured in accordance with the method of claim 5.

8. A conformance gauge for checking a conformance of at least one selected feature of a manufactured component within tolerance limits of the nominal dimensions of the feature comprising, a gauge with a first surface manufactured to a CAD data file comprising CAD data of a surface of the gauge within which the at least one feature lies such that the first surface of the gauge lies conformal with the surface of the component, and the gauge defining at least one viewing aperture wherein the edges of the viewing aperture determine the tolerance limits of the at least one inspected feature.

* * * * *